(12) United States Patent
McNair

(10) Patent No.: US 10,519,024 B1
(45) Date of Patent: Dec. 31, 2019

(54) SYSTEM AND METHOD FOR CLEANING BEVERAGE DISPENSERS

(71) Applicant: Chad T. McNair, San Antonio, TX (US)

(72) Inventor: Chad T. McNair, San Antonio, TX (US)

(*) Notice: Subject to any disclaimer, the term of this patent is extended or adjusted under 35 U.S.C. 154(b) by 0 days.

(21) Appl. No.: 15/692,952

(22) Filed: Aug. 31, 2017

Related U.S. Application Data

(60) Provisional application No. 62/382,158, filed on Aug. 31, 2016.

(51) Int. Cl.
*B67D 1/07* (2006.01)
*B08B 9/032* (2006.01)
*A47J 31/60* (2006.01)

(52) U.S. Cl.
CPC ............... *B67D 1/07* (2013.01); *A47J 31/60* (2013.01); *B08B 9/032* (2013.01); *B67D 2001/075* (2013.01)

(58) Field of Classification Search
CPC ...... B67D 1/07; B67D 2001/075; A47J 31/60; B08B 9/032
See application file for complete search history.

(56) References Cited

U.S. PATENT DOCUMENTS

| | | | | |
|---|---|---|---|---|
| 4,753,372 A * | 6/1988 | Pocock | ............... | B67D 1/07 134/169 R |
| 5,725,125 A * | 3/1998 | Bessette | ............... | B67D 1/0021 222/1 |
| 7,076,966 B2 * | 7/2006 | Mullen | ............... | B67D 3/0009 222/132 |
| 7,293,675 B1 * | 11/2007 | Luhn | ............... | B67D 1/07 137/238 |
| 7,762,431 B1 * | 7/2010 | Tuyls | ............... | F25D 31/002 222/146.6 |
| 8,893,926 B2 * | 11/2014 | Anderson | ............... | B67D 1/07 222/129.1 |
| 2007/0062212 A1 * | 3/2007 | Frank | ............... | A23G 9/22 62/342 |
| 2014/0374444 A1 * | 12/2014 | Forte | ............... | B67D 3/0022 222/144.5 |

* cited by examiner

*Primary Examiner* — Sharidan Carrillo
(74) *Attorney, Agent, or Firm* — Pizarro Allen PC

(57) ABSTRACT

A cleaning system for BIB beverage dispensers may comprise a rinse reservoir, a clean reservoir, and a first cleaning solution and a second cleaning solution. A method of cleaning BIB beverage dispensers may include dispensing from the clean reservoir a fluid having the first cleaning solution mixed therein, dispensing the second cleaning solution, allowing the second cleaning solution to rest in the beverage dispenser, and dispensing a rinse fluid.

6 Claims, 5 Drawing Sheets

SYSTEM AND METHOD FOR CLEANING BEVERAGE DISPENSERS

CROSS-REFERENCE TO RELATED APPLICATION

This application claims priority to U.S. Provisional Patent Application No. 62/382,158 entitled "SYSTEM AND METHOD FOR CLEANING BEVERAGE DISPENSERS" filed Aug. 31, 2016, which is hereby entirely incorporated herein by reference.

FIELD

The disclosed method and apparatus generally relate to bag-in-box (BIB) liquid beverage dispenser systems.

BACKGROUND

Restaurants, hotels, convenience stores, and other food service providers commonly use beverage dispensers that use BIB systems for product storage and delivery. However, while there is great convenience in being able to quickly connect a BIB product to such a dispenser, such convenience generally requires fluid tubes, connections, and other surfaces in contact with the liquid product that may be difficult to adequately clean. Thus, there remains a need for a system and method for cleaning such BIB dispensers.

DETAILED DESCRIPTION

In one embodiment, a cleaning system may comprise a reservoir body containing at least one rinse reservoir and at least one cleaning reservoir, each capable of fluid connection to a beverage dispenser using BIB connectors. The system may further comprise a first cleaning solution and a second cleaning solution. The system may be provided as a kit including at least one storage box, a dispensing cup, and cleaning brushes.

The first cleaning solution may be provided in a container capable of dispensing the first cleaning solution in a controlled manner, such as by the drop. The second cleaning solution may be packaged in a BIB-style container. In other embodiments, either or both of the first and second cleaning solutions may be provided in powder, gel or tablet form or in a predetermined quantity for dissolution in water. The first cleaning solution may have the same composition as the second cleaning solution, or may have a different composition. In other embodiments, the first cleaning solution may be the same as the second cleaning solution, but in a concentrated form.

Figure 1:
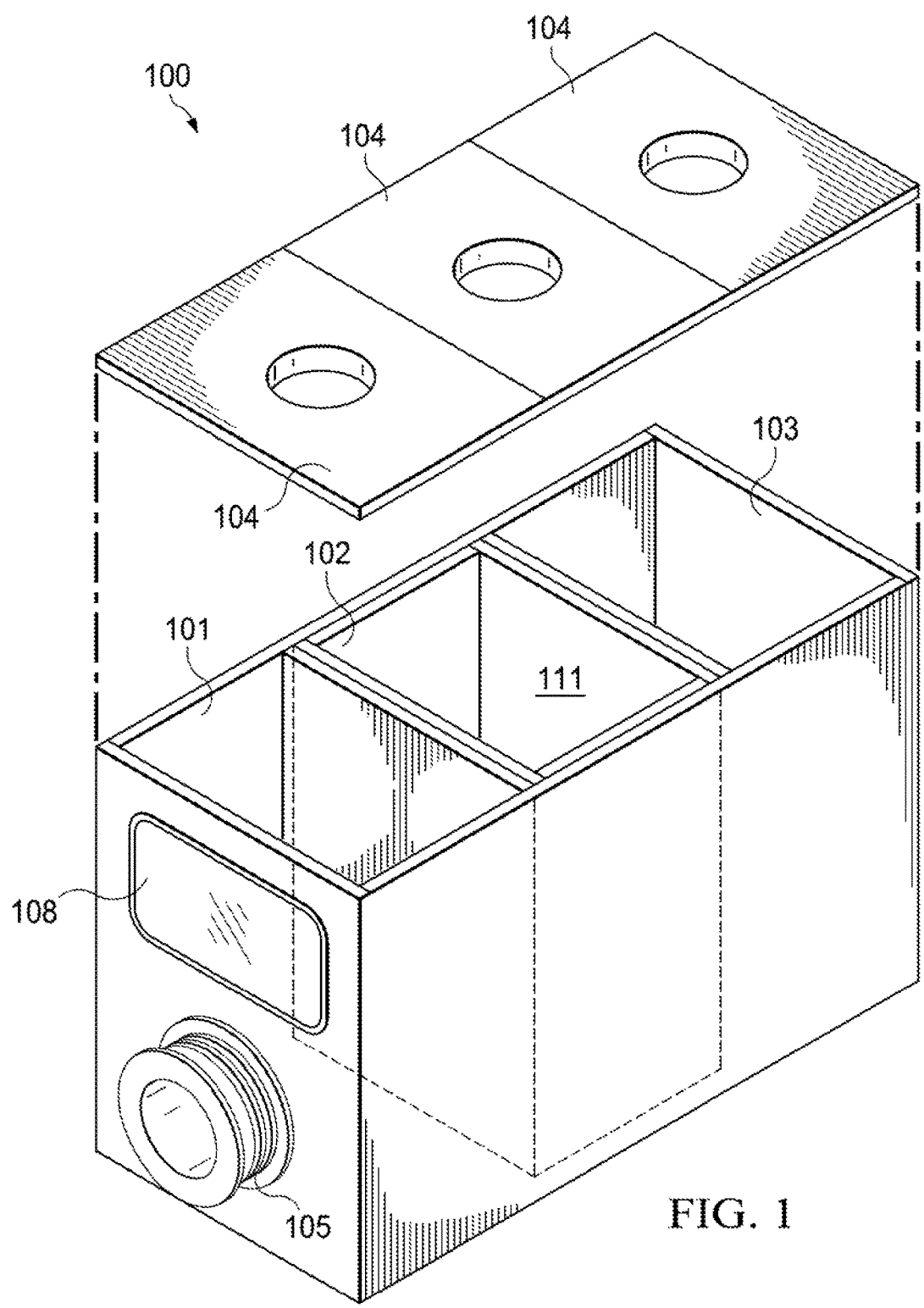
FIG. 1 depicts an embodiment of a reservoir body.

FIG. 1 shows an embodiment in which reservoir body 100 is constructed as a single body with three internal compartments. In this embodiment, a rinse reservoir 101 may be provided at one end of reservoir body 100 and a cleaning reservoir 103 may be located at the opposite end, with a storage box 102 located between the rinse reservoir 101 and cleaning reservoir 103, respectively. Lid 104 may be provided for closing each compartment. The lid 104 may comprise a single lid or multiple lids for covering the rinse reservoir 101, the cleaning reservoir 103 and the storage box 102. A label 108 may include cleaning instructions, such as those embodied in the cleaning method described in more detail herein.

Of course, the rinse and cleaning reservoirs may be provided together without a storage box 102. In some embodiments, the storage box 102 may have a removable container insert 111. Such an insert 111 may be used for storage purposes and also to catch drained or excess fluids during the cleaning process.

Figure 2:
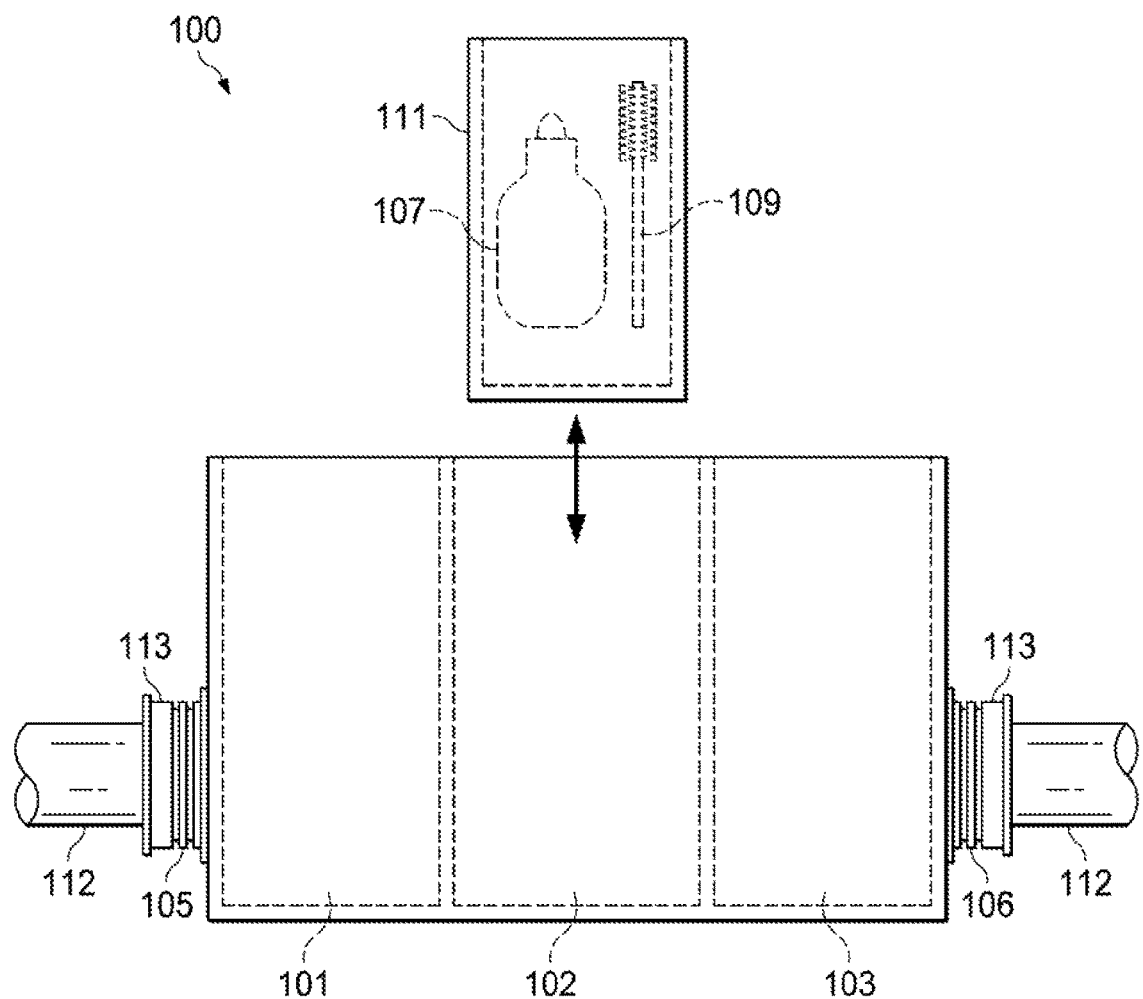
FIG. 2 depicts a side view of a reservoir body having a removable container.

With further reference to FIG. 2, the rinse and cleaning reservoirs 101 and 103, respectively, may include first and second dispenser hose connections 105 and 106, respectively. First and second dispenser hose connections 105 and 106 may be adapted for BIB-style connection. Said connections 105 and 106 may have caps (not shown) disposed over the outlet ends when not in use for cleaning operations, such as when being stored. While the rinse and clean reservoirs 101 and 103 may be used to hold water or other liquid for the cleaning process, storage box 102 may be used to store various kit items, such as cleaning solution bottle 107 containing a first cleaning solution and one or more cleaning brushes 109. Other useful items such as a dispensing funnel and dispensing cup (not shown in drawings) may be stored in the storage box 102 or storage box insert 111.

Further referring to FIG. 2, a dispenser hose 112 may connect to either first or second dispenser hose connection 105 and 106, respectively, via dispenser hose connector 113. The hose connector 113 may be a BIB hose connector. Hose connections 105 and 106 may be located on any outwardly accessible face of a reservoir, such as the top, bottom, or side. In some embodiments, hose connections may be provided as part of a fluid manifold. Such connection may allow the beverage dispenser (not shown) to draw liquid from the reservoir to which it is connected. This may allow the beverage dispenser to be cleaned or flushed through with a liquid of the user's choosing. This may be a mixture of water containing the first cleaning solution, or simply clean water.

Alternatively, the compartments 101, 102, and 103 may be individual modules that couple into a unitary body. These modular sections may be detachably joined to form one reservoir body. The modules may be joined by any suitable means, such as by external frame, fasteners, adhesive, hook-and-loop, weld, clamp, straps, magnets, tongue-and-groove, and any other suitable means. In other embodiments, the sections may be separately provided and used, or simply placed side-by-side on a shelf. In yet further embodiments, a cleaning reservoir and a rinse reservoir may comprise the same container.

In another embodiment, a second cleaning solution may be provided as a BIB package, such as the packages in which beverage product is contained, with a dispenser hose connection. In this embodiment, the first cleaning solution may be used to initially clean and flush the beverage dispenser fluid system, and a second cleaning solution may be used for final sterilization.

Figure 3:
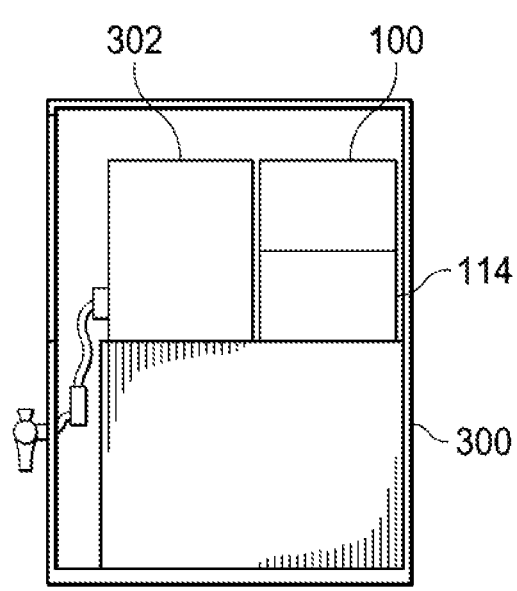
FIG. 3 depicts a side view of a beverage dispensing machine with the cleaning system stored behind the beverage packages.

In some embodiments, the system may be configured for placement in or about a beverage dispenser cabinet 300. In one such embodiment, as illustrated in FIG. 3, the reservoir body 100 and, where desired, a second cleaning solution 114 in a BIB package, may be stored inside the dispenser cabinet 300 and behind the one or more beverage BIB packages 302 containing beverage fluid to be dispensed. In another embodiment, not shown in the drawings, a cleaning system, comprising the reservoir body and second cleaning solution, may be provided with handles for ease of use and transportation. In another embodiment, not shown in the drawings, the cleaning system, comprising the reservoir body and second cleaning solution, may be mounted to a rolling cart for ease of use and transportation.

The reservoir body materials may be any suitable material, such as those that typically exhibit qualities such as liquid impermeability, rigidity, chemical stability, and resistance to corrosion and heat. This group of materials includes many plastics, such as HDPE, and metals, such as stainless steel. In some embodiments, the reservoir body materials may comprise sterilizable food-safe materials.

The foregoing system may be used according to a variety of methods. In one embodiment, the cleaning and rinse reservoirs may be filled with clean water. The beverage dispenser's BIB hose may be connected to the cleaning reservoir. A portion of the first cleaning solution may be mixed with the water in the clean reservoir. The beverage dispenser may then be operated to dispense fluid from the clean reservoir for a first period of time. The dispensed fluid may then be discarded. After such period of time, the BIB hose may be disconnected from the clean reservoir and connected to the second cleaning solution, which may be conveniently provided in a BIB package. The beverage dispenser may then be operated to dispense the second cleaning solution for a second period of time. The dispensed fluid may then be discarded. The beverage dispenser may then be operated and shut off to allow the second cleaning solution to remain in the beverage dispenser fluid system. The cleaning solution may thus be allowed to dwell in the fluid transfer sections of the beverage dispenser for a third period of time. After the third period of time, the BIB hose may be disconnected from the second cleaning solution and connected to the rinse reservoir. The beverage dispenser may be operated for a fourth period of time to rinse out the second cleaning solution from the beverage dispenser fluid system, thus completing the cleaning method. The dispensed fluid may then be discarded. The BIB hose may thereafter be disconnected from the rinse reservoir and connected to a beverage BIB package for beverage product dispensing. In some embodiments, a beverage product may be immediately dispensed for a fifth period of time so as to allow the dispense ratio (e.g., the ratio of beverage product to water) of the beverage product dispenser, if any, to return to a desired ratio for consumption.

In some embodiments, the cleaning and rinse reservoirs may be filled with cold water or hot water. In other embodiments, the reservoirs may be filled with any other suitable fluid, such as a rinse agent, or descaling agent. The cleaning reservoir may be filled with a first cleaning solution in suitable concentration. In other embodiments, a first cleaning solution may be added to clean water in the clean reservoir in an amount determined to provide a predetermined concentration, such as 10 drops from a liquid dropper, or a measured quantity of cleaning solution powder, for example. The first cleaning solution and second cleaning solution may be different cleaning solutions, or may be the same cleaning solution provided in separate containers, or may be the same cleaning solution used in different concentrations or at different temperatures or some combination of the afore mentioned parameters. In some situations, the first cleaning solution may be adequate and the second cleaning solution may not be required.

A dispensing cup or the storage box insert may be used to catch and dispose of dispensed fluid during the cleaning method. In other embodiments, the drain system of a beverage dispenser may be used to catch and dispose of dispensed fluid during the cleaning method. A brush may be used to clean hose connectors, voids and surfaces on which beverage product residue may be lodged.

The beverage dispenser cleaning operation and fluid dwell time periods may vary based on the nature, strength, and concentration of the first cleaning solution and the second cleaning solution, and on the volume and flow rate of the beverage dispenser. Other time period determining factors may include the nature and type of beverage product the dispenser normally dispenses, the time period between cleaning operations on a particular dispenser or subsystem of a dispenser, the physical structure of the dispenser, such as length or bore of tubing, number of pumps, number of taps per feed line, or other such system-specific or beverage-specific factors.

A label 108 (FIG. 1) may be provided on the reservoir body and/or BIB-packaged cleaning solution to explain a method for using the cleaning system. Such a label may include general instructions for use and may also include a chart or charts for appropriate time periods based on the aforementioned factors. Such a label may be specific to a particular type of dispenser (brand, design, or particular beverage) or such a label may be generalized to cover all dispensers or a family thereof. In some embodiments, the first time period may be about 60 seconds, the second time period may be about 20 seconds, the third time period may be about three minutes, and the fourth time period may be about 60 seconds. A fifth period of time post-cleaning may be about 20 seconds.

In other embodiments, the first time period may range from about 30 to 90 seconds, the second time period may range from about 10 to 30 seconds, the third time period may range from about two to five minutes, and the fourth time period may range from about 30 to 90 seconds. A fifth period of time post-cleaning may range from about 10 to 30 seconds. During the cleaning method, a beverage dispenser may be set to dispense a product concentrate so as to draw fluid only from the reservoirs or cleaning solution package, as the case may be. In other embodiments, a dispenser may be set to dispense a finished product so as to draw fluid from the reservoirs or cleaning solution package and another fluid source.

In yet other embodiments, a single fluid reservoir may be used as both a cleaning reservoir and as a rinse reservoir. In such embodiments, the reservoir may be filled with clean water. The beverage dispenser's BIB hose may be connected to the reservoir. A portion of the first cleaning solution may be mixed with the water in the reservoir. The beverage dispenser may then be operated to dispense fluid from the reservoir for a first period of time. The dispensed fluid may then be discarded. After such period of time, the BIB hose may be disconnected from the reservoir, and the reservoir rinsed out and filled with a second cleaning solution. The BIB hose may then be re-connected to the reservoir. Alternatively, the reservoir may be filled with a second cleaning solution without disconnecting the BIB hose. The beverage dispenser may then be operated to dispense the second cleaning solution for a second period of time. The dispensed fluid may be disposed. The beverage dispenser may then be shut off for a third period of time to allow the second cleaning solution to remain in the beverage dispenser fluid system. After the third period of time, the BIB hose may be disconnected from the reservoir, and the reservoir rinsed out and filled with clean water. The BIB hose may then be re-connected to the reservoir. Alternatively, the reservoir may be filled with a second cleaning solution without disconnecting the BIB hose. The beverage dispenser may be operated for a fourth period of time to rinse out the second cleaning solution from the beverage dispenser fluid system, thus completing the cleaning method. The dispensed fluid may then be disposed. The BIB hose may thereafter be disconnected from the reservoir and connected to a beverage BIB package for product dispensing.

Figure 4:
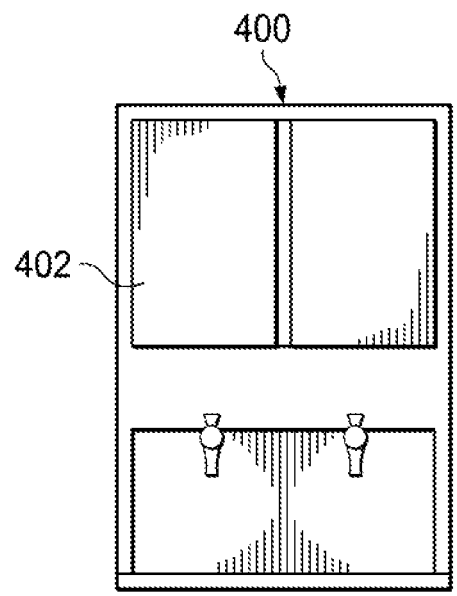
FIG. 4 depicts a front view of the beverage dispensing machine of FIG. 3 with closed access doors.
Figure 5:
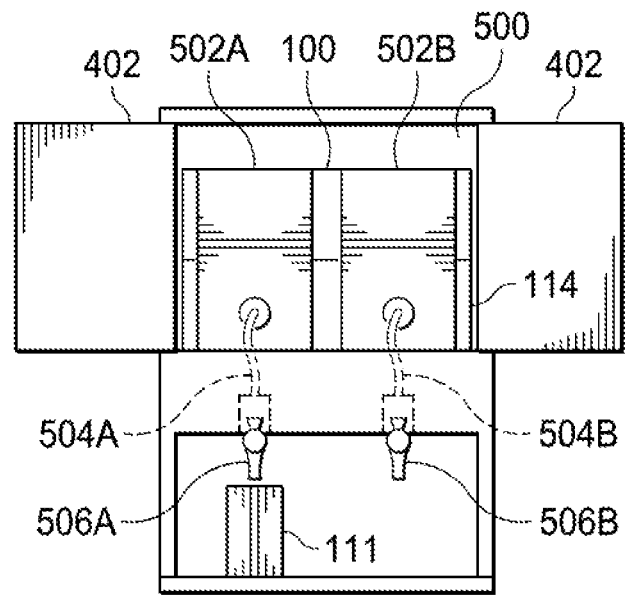
FIG. 5 depicts a front view of the beverage dispensing machine of FIG. 3 with open access doors.

In an example of the first disclosed method, the cleaning system may be used to clean BIB beverage dispensing machines such as a Bunn coffee dispenser. The cleaning system may comprise of two separate parts, the reservoir body and the second BIB-style package containing the second cleaning solution (herein a sanitizing solution) that may be used in succession to effectively clean the hoses, pumps, and dispensing taps of the aforementioned coffee machine. Illustrations of the machine and cleaning system as used in the exemplary process may be seen in FIGS. 4 and 5, with FIG. 4 showing the coffee machine 400 in normal operating configuration with the access doors 402 closed and FIG. 5 showing the coffee machine 400 with open doors 402 so as to permit implementation of a cleaning process.

For example, the method to utilize the cleaning system on a Bunn coffee dispenser are as follows. The method may comprise the following steps in the order described, or in any other suitable order. Open the access doors 402 of the beverage dispensing machine cabinet 500 to display the BIB beverage product 502A and 502B, as shown in FIG. 5. Carefully disconnect one beverage BIB package 502A (assuming that package is to be cleaned first), from the associated hose 504A and remove it from the cabinet 500. Remove the beverage product module 502A from the cabinet. Remove the cleaner body 100 and BIB cleaning solution 114 from the cabinet 500. The storage box insert 111 may be placed below the associated dispenser tap 506A so as to catch liquid runoff Beverage BIB package 502B may also be removed for convenience.

Fill the cleaning reservoir of the reservoir body 100 with hot water. Fill the cleaning reservoir to a fill line that may be marked on the side of the cleaning reservoir. Repeat this step with the rinse reservoir located on the opposite end of the reservoir body. Once the cleaning reservoir has been filled to the fill line, 12-16 drops of a first cleaning solution may be added to the cleaning reservoir.

Remove the cap from the BIB hose connector on the cleaning reservoir. Place the reservoir body 100 into the space in which the removed beverage product module 502A was located inside of the cabinet 500. Attach the beverage dispensing machine BIB hose 504A to the dispenser hose connection 105 associated with the cleaning reservoir of the reservoir body 100. Alternatively, the beverage dispensing machine BIB hose 504A may be attached to the dispenser hose connection 105 before filling the reservoir. Connecting the hose will allow the beverage machine to draw liquid from the reservoir to which it is connected and allow the beverage dispenser to be cleaned or flushed with water treated with the cleaning solution. Then, if not previously done so, place the storage box insert 111 underneath the beverage dispenser tap 506A and switch the beverage machine from rinse to prime. Switching the machine to "prime" turns off the water pump, and allows for only cleaning solution to be pumped through the machine's BIB hose and out the dispenser. Allow the machine to run for about 20 seconds to clear out any solids that have built up in the beverage machine. After approximately 20 seconds, the dispensed liquid should become relatively clear.

Once the dispensed liquid runs clear, disconnect the beverage machine's BIB hose 504A from the cleaning reservoir and remove the reservoir body 100 from the cabinet 500. A second cleaning solution 114, the "Sanitization Product," may be conveniently used due to packaging in a BIB-style container. Remove the cap from the dispenser hose connection and hook the beverage dispensing machine's BIB hose 504A to the BIB-style package containing the second cleaning solution 114. Place the container 114 in the beverage dispensing machine cabinet 500 in the space where the reservoir body 100 was previously held. The beverage dispensing machine may be operated for a second period of time in which the sanitizing solution is pumped through the machine's hose and dispensing apparatus. Here, this process may take about three minutes. The brush provided with the cleaning kit may be used to clean the beverage dispensing machine's hose connectors, voids and surfaces on which beverage product residue may be lodged. The dispensing fluid may be discarded at the conclusion of this process.

After using the sanitizing product, disconnect the second cleaning package 114 and remove from the beverage dispensing machine's cabinet 500. Fill the rinsing reservoir of the reservoir body 100 with clean water and return the cleaning kit to the storage box or other desired storage location. Connect the beverage machine's BIB hose 504A to the rinse reservoir at the dispenser hose connection associated with the rinse reservoir. Once the hose 504A is securely connected, dispense the water contained in the rinse reservoir for approximately 30 seconds. Then disconnect the BIB hose 504A and remove the reservoir body 100 from the machine.

Next, reconnect the beverage machine's BIB 504A hose to a beverage BIB package, and twist said hose 504A until a clicking sound is heard. Set the beverage machine from prime back to normal. Close the cabinet doors 402 and begin to dispense liquid into a cup or other suitable container until the all remaining fluid is evacuated from the system. The dispensing machine should then indicate the fluid reservoir for the machine requires refilling, the cleaning process is now complete and the beverage dispensing machine is ready to begin dispensing beverages.

Figure 6:
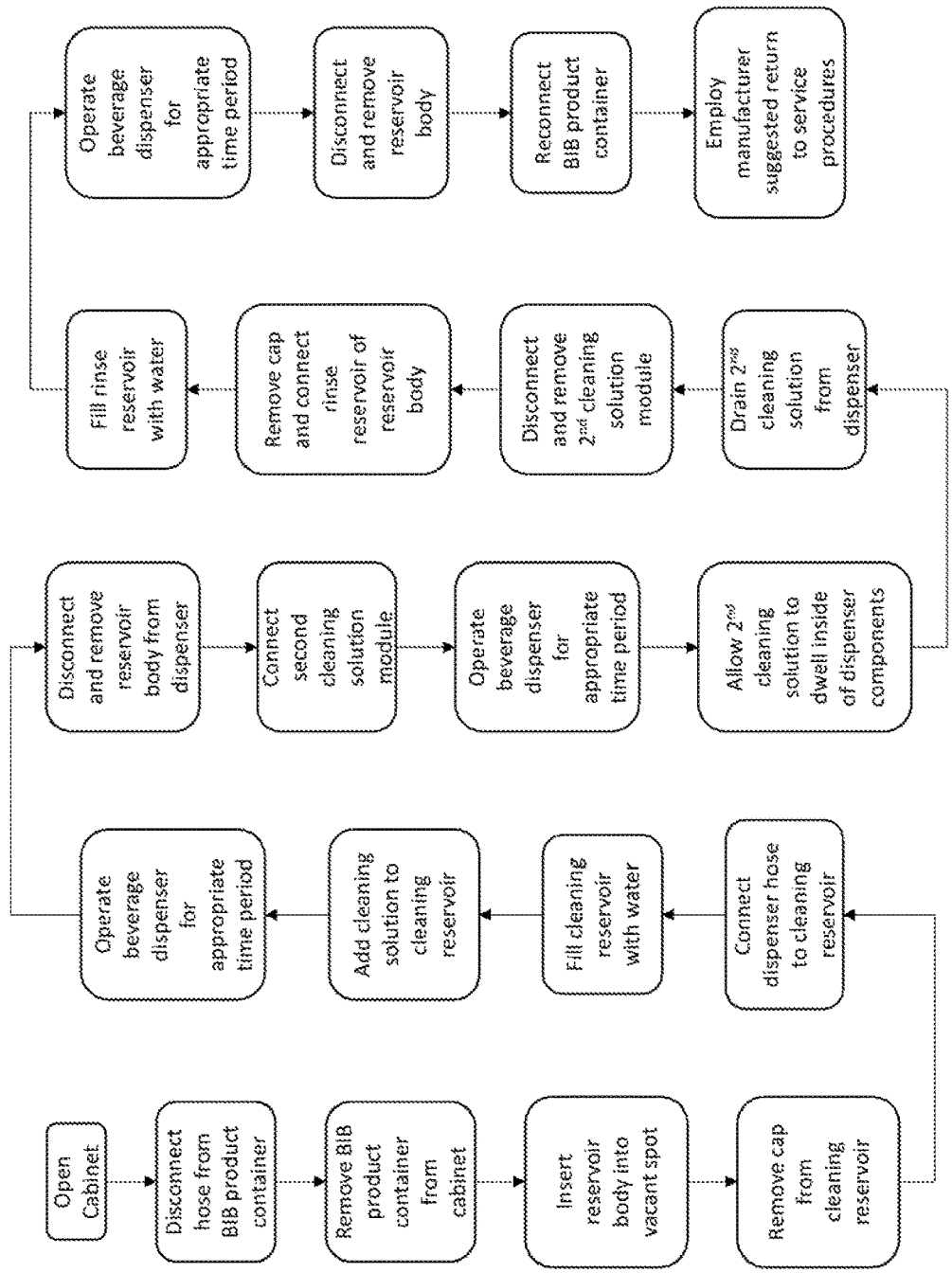
FIG. 6 depicts a flowchart of one embodiment of a cleaning method.
Figure 7:
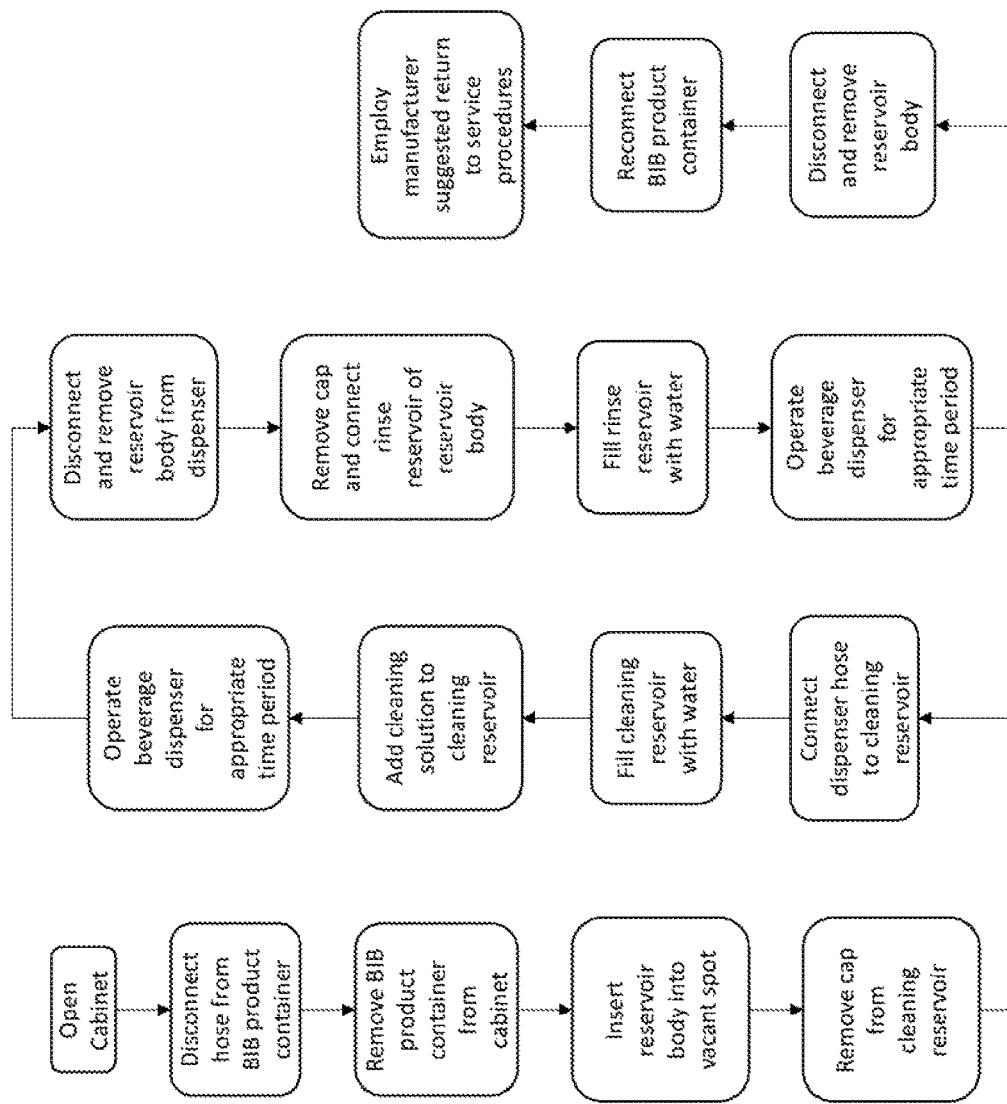
FIG. 7 depicts a flowchart of another embodiment of a cleaning method.

Flowcharts of example cleaning processes are found in FIGS. 6 and 7.

Although the disclosed subject matter and its advantages have been described in detail, it should be understood that various changes, substitutions and alterations can be made herein without departing from the invention as defined by the appended claims. Moreover, the scope of the claimed subject matter is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

I claim:

1. A method of cleaning a bag-in-box beverage dispenser having a cabinet for containing a bag-in-box beverage product package, the beverage dispenser having a dispenser hose connectable to a bag-in-box product package, the method comprising:
   providing a reservoir body in a bag-in-box beverage dispenser cabinet, the reservoir body constructed as a single body from a rigid and liquid impermeable material, the reservoir body including a first bag-in-box hose connection and a second bag-in box hose connection, the reservoir body further comprising:
      a first internal compartment comprising a clean reservoir, the clean reservoir in fluid communication with said first bag-in-box hose connection, the first bag-in-box hose connection located on a first outwardly accessible face of the reservoir body;
      a second internal storage compartment providing a cleaning bottle including a concentrated cleaning solution, and
      a third internal compartment comprising a rinse reservoir, the rinse reservoir in fluid communication with said second bag-in-box hose connection, the second bag-in-box hose connection located on a second outwardly accessible face of the reservoir body;
   preparing a first cleaning solution in said clean reservoir by adding a predetermined amount of said concentrated cleaning solution to clean water in the clean reservoir;
   connecting the dispenser hose to the first bag-in-box hose connection of the clean reservoir;
   after connecting the dispenser hose to the first bag-in-box hose connection, dispensing the first cleaning solution through the dispenser by drawing the first cleaning solution through the dispenser hose so as to flush the first cleaning solution through the dispenser for a first period of time;
   after dispensing the first cleaning solution through the dispenser, disconnecting the dispenser hose from the first bag-in-box hose connection;
   after disconnecting the dispenser hose from the first bag-in-box hose connection, providing a second cleaning solution stored in the dispenser cabinet and dispensing the second cleaning solution through the dispenser by drawing the second cleaning solution through the dispenser hose so as to flush the second cleaning solution through the dispenser for a second period of time;
   after dispensing the second cleaning solution through the dispenser, allowing the second cleaning solution to rest in the dispenser for a third period of time;
   preparing a rinse liquid in the rinse reservoir by adding a rinse liquid to said rinse reservoir; and
   after allowing the second cleaning solution to rest in the dispenser, dispensing said rinse liquid through the dispenser for a fourth period of time so as to flush the rinse liquid through the bag-in-box beverage dispenser to remove the first cleaning solution and the second cleaning solution from the dispenser.

2. The method of claim 1, wherein the first period of time ranges from about 30 seconds to about 90 seconds, the second period of time ranges from about 10 seconds to about 30 seconds, the third period of time ranges from about two minutes to about five minutes, and the fourth period of time ranges from about 30 seconds to about 90 seconds.

3. The method of claim 2, wherein the first period of time is about 60 seconds, the second period of time is about 20 seconds, the third period of time is about three minutes, and the fourth period of time is about 60 seconds.

4. The method of claim 1, further comprising:
   disconnecting the dispenser hose from the second bag-in-box hose connection and connecting the dispenser hose to a bag-in-box product package; and
   dispensing a beverage product from the bag-in-box product package for a fifth period of time.

5. The method of claim 3, the beverage product comprising a beverage concentrate, wherein dispensing the beverage product comprises mixing the beverage concentrate with water, the fifth period of time continuing until a beverage product ratio of beverage concentrate to water has been achieved.

6. A method of cleaning a bag-in-box beverage dispenser having a cabinet for containing a bag-in-box beverage product package, the beverage dispenser having a dispenser hose connectable to a bag-in-box product package, the method comprising:
   providing a reservoir body in a bag-in-box beverage dispenser cabinet, the reservoir body including a first internal reservoir, a second internal reservoir, and a third internal reservoir, wherein the reservoir body forms a single body by coupling each of the internal reservoirs together with fasteners;
   said first internal reservoir in fluid communication with a first bag-in-box hose connection located on a first outwardly accessible face of the reservoir body;
   said second internal reservoir including a storage compartment providing a cleaning bottle including a concentrated cleaning solution, and
   said third internal reservoir in fluid communication with a second bag-in-box hose connection located on a second outwardly accessible face of the reservoir body;
   preparing a first cleaning solution in said first internal reservoir, the first cleaning solution prepared by adding a predetermined amount of said concentrated cleaning solution to clean water in the first internal reservoir;
   preparing a rinse liquid in said third internal reservoir by adding rinse liquid to said third internal reservoir;
   connecting the dispenser hose to the first bag-in-box hose connection of the first internal reservoir;
   after connecting the dispenser hose to the first bag-in-box hose connection, dispensing the first cleaning solution through the dispenser by drawing the first cleaning solution through the dispenser hose so as to flush the first cleaning solution through the dispenser; and
   after allowing the first cleaning solution to rest in the dispenser, dispensing the rinse liquid from said third internal reservoir through the dispenser so as to flush the rinse liquid through the bag-in-box beverage dispenser to remove the first cleaning solution from the dispenser.

* * * * *